United States Patent [19]

McPherson

[11] 3,713,095

[45] Jan. 23, 1973

[54] DATA PROCESSOR SEQUENCE CHECKING CIRCUITRY

[75] Inventor: Alan Forbes McPherson, 12 Hilsinger Rd., Mt. Tabor, N.J. 07878

[73] Assignees: Bell Telephone Laboratories, Inc., Murray Hill, N.J.

[22] Filed: March 16, 1971

[21] Appl. No.: 124,736

[52] U.S. Cl.....340/146.1 AB, 235/153 A, 340/147 R

[51] Int. Cl.................................................G06f 11/00

[58] Field of Search.........340/146.1 AB, 172.5, 147; 235/153 A; 328/152; 307/232, 236

[56] References Cited

UNITED STATES PATENTS

| | | | |
|---|---|---|---|
| 3,428,945 | 2/1969 | Toy | 340/146.1 |
| 3,534,403 | 10/1970 | Matarese | 235/153 |
| 3,593,279 | 7/1971 | Pumpe | 340/146.1 |

*Primary Examiner*—Charles E. Atkinson
*Attorney*—R. J. Guenther and William L. Keefauver

[57] ABSTRACT

Apparatus for detecting illogical sequences of operations in digital processor units. Apparatus comprising logic gates is included at several points within a processor unit to provide early detection of hardware failures. The apparatus is designed to monitor the sequence of operations that occur when particular processor registers are loaded from a plurality of sources and unloaded to a plurality of destinations.

13 Claims, 5 Drawing Figures

INVENTOR
A.F. McPHERSON
BY R.O. Nimtz
ATTORNEY

DATA PROCESSOR SEQUENCE CHECKING CIRCUITRY

The invention herein claimed was made in the course of or under a contract with the Department of the Army.

BACKGROUND OF THE INVENTION

1. Field of the Invention

This invention relates to error detection circuitry suitable for use in a digital processor unit, and, more particularly, to apparatus for detecting illogical sequences occurring in the operation of a processor unit.

2. Description of the Prior Art

The burgeoning complexity of modern day digital computers allows increasingly sophisticated problems to be solved. This expansion in capability is achieved through the use of highly complex hardware and software. The benefits accruing from the utilization of such sophisticated technology are, however, somewhat diminished by the fact that the errors that occur in such computers are also increasingly sophisticated, and hence more difficult to detect and correct.

The prior art is rich in apparatus and techniques for error detection and control in digital processing systems. One of the oldest of such techniques is the use of parity bits. A parity bit is used as an extra bit of a digital word to make the total number of bits of the word that are set to 1 always odd or always even, as desired. Each time the word is read its parity is checked and in this way an error that may have occurred can be detected.

In addition to parity checking, more sophisticated techniques such as program checking, error detecting codes, and system duplication are well known to the prior art. These techniques are discussed, for example, on pages 583–585 of the well-known text *Electronic Digital Systems* by R. K. Richards, published by John Wiley and Sons, Inc., and copyrighted in 1966.

All of the above techniques provide ways of checking the continuing validity of the information contained in a digital word through the utilization of information redundancy in one form or another. A problem can arise, however, when a logic circuit or component fails in such manner as to corrupt the data in a way which cannot be detected by these normal error detection means. For example, such a failure might cause an illogical processor sequence to occur. In this context the term "illogical sequence" refers to an unintended series of operations which occur at the microprogram level, particularly the improper loading or unloading of a register. This term is to be distinguished from a sequence of program instructions; it refers to the operation of the digital circuitry and not to the programming rules and statements associated with the programming languages being executed by the processor.

An illogical sequence, such as the undesired simultaneous loading of a register from two or more sources, can cause a word of information to be destroyed without generating any kind of error signal. Similarly, unloading a register to an improper output can have the effect of generating a new word where none was supposed to exist. Both of these conditions can occur in such a way that parity rules are not violated. Although it is true that such errors may eventually result in the data being corrupted to such an extent as to be detected by ordinary means, often a significant period of time will elapse between the time the error actually occurred and the time it was detected. This not only makes identification of the source of the error impossible, especially in the case of transient errors, but makes it very difficult to determine just how much data has been corrupted. This problem is particularly significant in a real-time data processing system.

Another disadvantage of prior art error detection apparatus is that it is usually incapable of detecting hardware design errors. Even if the hardware functions properly, problems can still arise when the hardware design is such that certain combinations of conditions were inadequately provided for. For example, an action that was supposed to have taken place upon the occurrence of a particular stimulus may not take place, or an undesired action may take place in response to the stimulus. This problem is particularly likely to arise in large-scale multiprocessing multiprogramming systems.

It is therefore an object of this invention to provide a means for detecting data corruption caused by hardware failures as soon as such failures occur.

It is another object of this invention to detect illogical processor sequences which occur due to the failure of a hardware component.

It is a further object of this invention to detect illogical processor sequences that occur as a result of faulty hardware design.

It is another object of this invention to facilitate the detection of transient errors.

It is a specific object of this invention to provide apparatus which will achieve the above-stated objects in an existing data processor without requiring a change in the control and timing of the existing processor sequences due to these checks.

It is a more specific object of this invention that the amount of apparatus utilized in practicing the invention be minimized while the amount of logic that can be checked is maximized.

SUMMARY OF THE INVENTION

These objects are achieved in accordance with this invention through the provision of a novel arrangement of logic circuitry. This logic circuitry allows the detection of illogical processor sequences by monitoring specific registers in the processor unit. The monitoring is performed through the utilization of the existing system timing signals which control the loading and unloading of the registers to be checked. The novel logic circuitry detects the simultaneous loading from more than one source and the simultaneous unloading to more than one destination. In addition, the register load and unload pulses from all sources are counted to verify that each load request is accompanied by one and only one unload request. The detection of any of these error conditions results in the generation of an error signal which can serve as an interrupt to the system, or which may be used by a particular system in any other desired manner.

DETAILED DESCRIPTION

Figure 1:
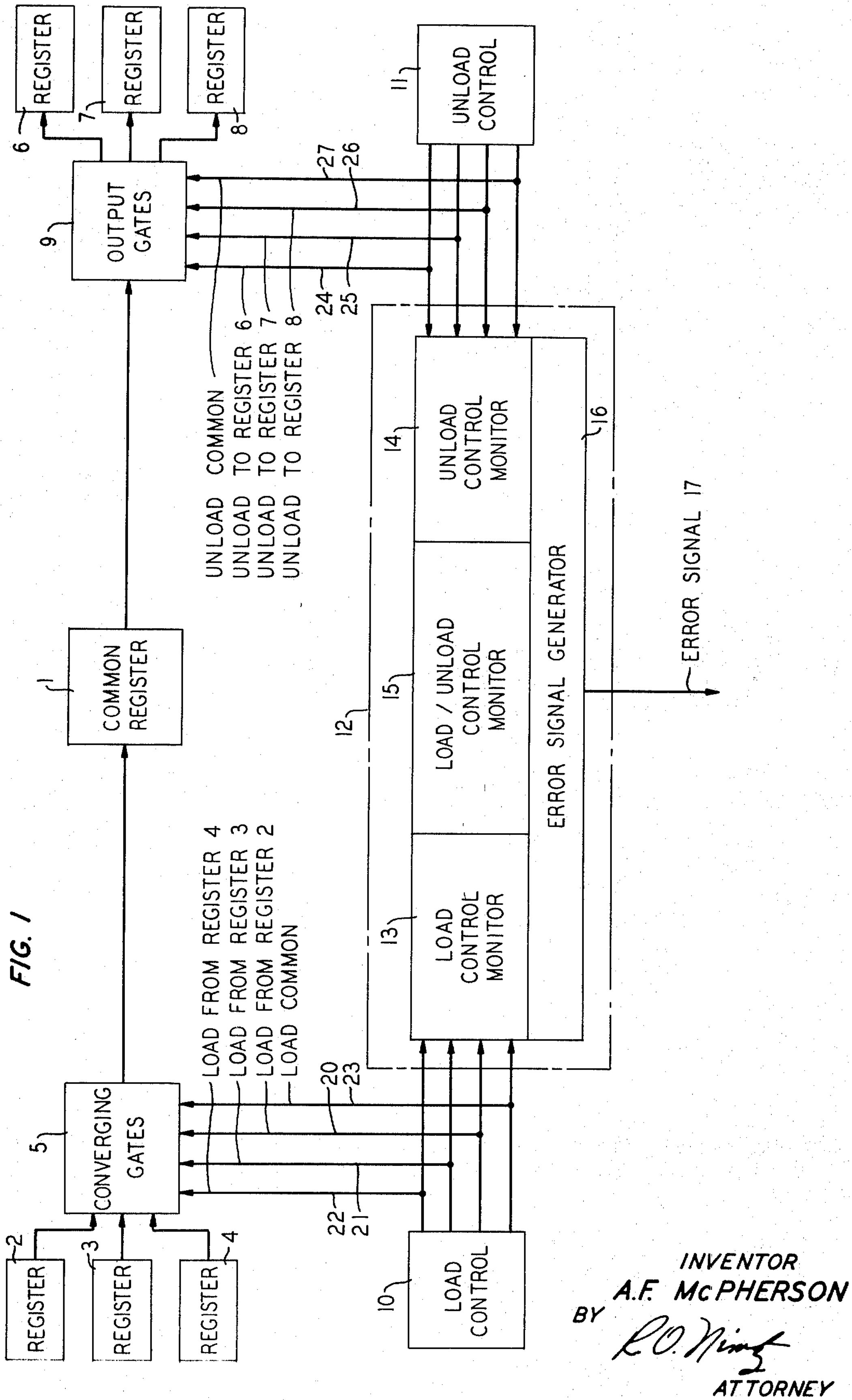
FIG. 1 is a block diagram illustrating a generalized application of the instant invention.

FIG. 1 is a generalized block diagram illustrating the use of the instant invention wherein it is assumed that the sequence of operations to common register 1 is to be monitored. Common register 1 may be loaded from source registers 2, 3, or 4 through converging gates 5, and may be unloaded to destination registers 6, 7, or 8 through output gates 9. The loading of register 1 is controlled by load control 10 and the unloading of register 1 is controlled by unload control 11. These operations are monitored by the sequence monitor circuitry of the instant invention, shown as the dotted block 12 in FIG. 1.

Sequence monitor circuitry 12 comprises four basic elements. Load control monitor 13 has as its inputs all of the control signals on lines 20–23 which are used to load common register 1 through converging gates 5. Unload control monitor 14 has as its inputs all of the control signals on lines 24–27 used to unload common register 1 through output gates 9. The load/unload control monitor 15 receives its inputs from load control monitor 13 and unload control monitor 14. Error signal generator 16 receives inputs from monitors 13, 14, and 15 and generates an error signal on line 17.

Figure 2:
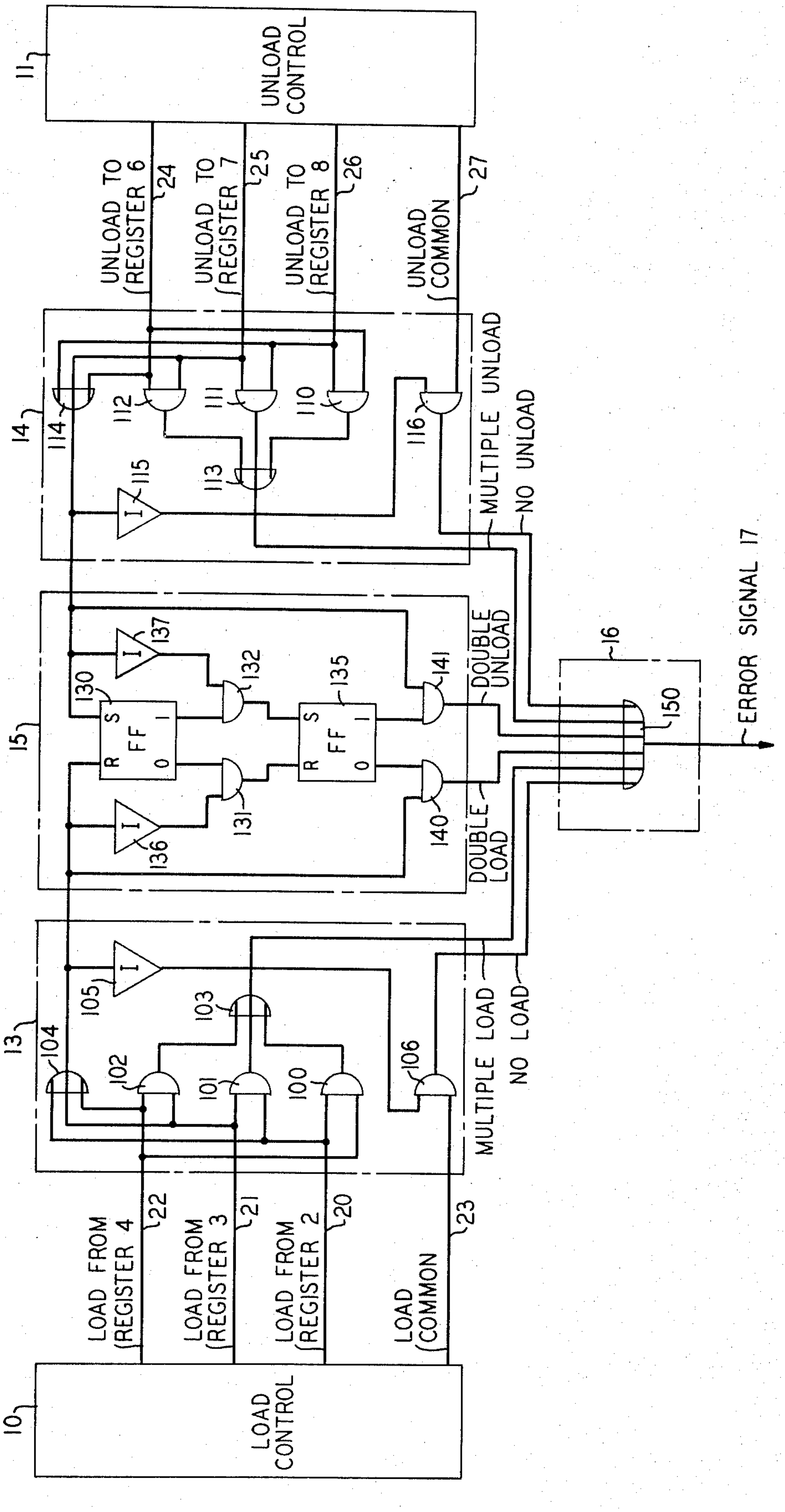
FIG. 2 is a detailed diagram of the logic circuitry which is used in FIG. 1 in accordance with the instant invention.

FIG. 2 is a detailed logic diagram of the load control monitor 13, unload control monitor 14, load/unload control monitor 15, and error signal generator 16 which comprise the sequence monitor circuitry shown as dotted block 12 in FIG. 1.

As can be seen in FIG. 2, load control monitor 13 comprises a plurality of AND gates and OR gates and an inverter. The inputs to AND gates 100, 101, 102, and 106 consist of the control lines 20–23 from load control 10. In this particular example it is assumed that the signals on lines 20–22 are voltage levels, hereinafter termed "commands", while the signal on line 23 is a timing strobe. Thus in FIG. 1 converging gates 5 would gate the contents of that one of registers 2–4 indicated by a command on one of lines 20–22 at the time the timing strobe appears on load common line 23.

AND gate 100 generates an output if and only if commands to load register 1 from register 2 and register 4 occur simultaneously. AND gates 101 and 102 similarly generate an output if two load commands are simultaneously present. An output from any of these AND gates means that an undesired multiple load has occurred. Thus the outputs of AND gates 100, 101, and 102 are ORed together by OR gate 103, and the output of OR gate 103 is connected to error signal generator 16.

OR gate 104 generates an output to load/unload control monitor 15 whenever a command is sent from load control 10. The output of OR gate 104 is inverted by inverter 105 and applied to AND gate 106. The load common signal is also applied to AND gate 106 on lines 23. The output of inverter 105 enables AND gate 106 in the absence of any load control commands from load control 10. If AND gate 106 is simultaneously enabled by the load common signal on line 23, indicating that none of the source registers 2, 3, or 4 has been chosen at the time the load timing strobe occurs, then AND gate 106 generates an output signal indicating that a "no-load" condition has occurred. This output signal is applied to error generator 16.

Unload control monitor 14 operates in a manner exactly analogous to load control monitor 13 in response to the unload control commands on lines 24–26 and the unload common signal on line 27. That is, AND gates 110, 111, and 112 in combination with OR gate 113 serve to generate a "multiple unload" signal whenever two or more unload control commands are simultaneously present. The output of OR gate 113 indicating a "multiple unload" condition is applied to error signal generator 16. OR gate 114 operates in a manner analogous to OR gate 104 in supplying a signal to load/unload control monitor 15. In addition, the output of Or gate 114 is inverted by inverter 115 and applied to AND gate 116. The output of inverter 115 will enable AND gate 116 in the absence of any unload control commands from unload control 11. If AND gate 116 is simultaneously enabled by the unload common signal on line 27, indicating that none of the destination registers 6, 7, or 8 has been chosen at the time the unload timing strobe occurs, then AND gate 116 generates an output signal indicating that a "no-unload" condition has occurred. This output signal is also applied to error signal generator 16.

Load/unload control monitor 15 is shown in FIG. 2 to comprise a one-bit double-rank counter including flip-flops 130, 135 and coupling gates 131 and 132. Load/unload control monitor 15 only requires a one-bit counter since it need only store the last command that was received, compare it with the current command, and generate an output signal if they are the same. Thus flip-flop 130 merely serves as a holding stage for flip-flop 135 during the presence of each command. This use of a holding stage implicitly assumes that direct coupled transistor logic (DCTL) is used to implement the circuit of FIG. 2. While this type of logic would undoubtedly be used in any application requiring high-speed operation, there exist many applications that do not require high speed. In these cases slower logic circuitry of the type employing trailing-edge detection could be used. In such a case, flip-flop 130, AND gates 131,132 and inverters 136,137 could be eliminated from FIG. 2, and the outputs of OR gates 104 and 114 could be directly connected to the reset and set inputs, respectively, of flip-flop 135.

Continuing with the description of FIG. 2, it is seen that OR gate 104 of load control monitor 13 supplies an input signal to the reset input of flip-flop 130 whenever a load command is generated by load control 10. Similarly OR gate 114 supplies an input to flip-flop 130 whenever an unload command is generated by unload control 11. AND gates 131 and 132 serve to gate the reset and set outputs of flip-flop 130 to flip-flop 135. These AND gates are required to allow a proper settling time for flip-flop 130. Inverters 136 and 137 serve to inhibit AND gates 131 and 132, respectively, during the presence of either a load control command or an unload control command. Thus the current contents of flip-flop 130 are not transferred to flip-flop 135 until after the respective control commands have occurred.

As indicated above, the current state of flip-flop 135 at any particular time serves to identify the last control command that was received. If flip-flop 135 is in the reset state, the last control command was a load command. If it is in the set state, the last control command received was an unload command. AND gate 140 combines the reset output of flip-flop 135 with the output of OR gate 104. Thus AND gate 140 will generate an output if, and only if, the last control command received was a load command and the current control command is a load command, thus indicating a "double load." AND gate 141 is connected to the set output of flip-flop 135 and to the output of OR gate 114. AND gate 141 will thus generate an output if, and only if, the last control command received was an unload command and the current control command is an unload command, thus indicating a "double unload." The outputs of AND gates 140 and 141 are both applied to error signal generator 16.

Error signal generator 16 is seen in FIG. 2 to comprise a single multi-input OR gate 150. OR gate 150 generates an output signal on line 17 whenever a "no-load," "multiple-load," "double-load," "no-unload," "multiple-unload," or "double-unload" signal is received. This error signal may be used by the associated equipment in any desired manner.

The AND gates, OR gates, inverters and flip-flops shown in FIG. 2 are, as previously indicated, of the DCTL type well known to the prior art. They may be formed, for example, from the MECL series of integrated logic circuits which are commercially available from Motorola Semiconductor Products, Inc. Additionally, the present invention may be practiced using other kinds of logic gates well known to the prior art, such as NAND or NOR gates. The particular choice of logic gates needed to apply this invention to any existing digital system forms no part of this invention and will not be further discussed here as such choice will be obvious to all skilled workers.

Figure 3:
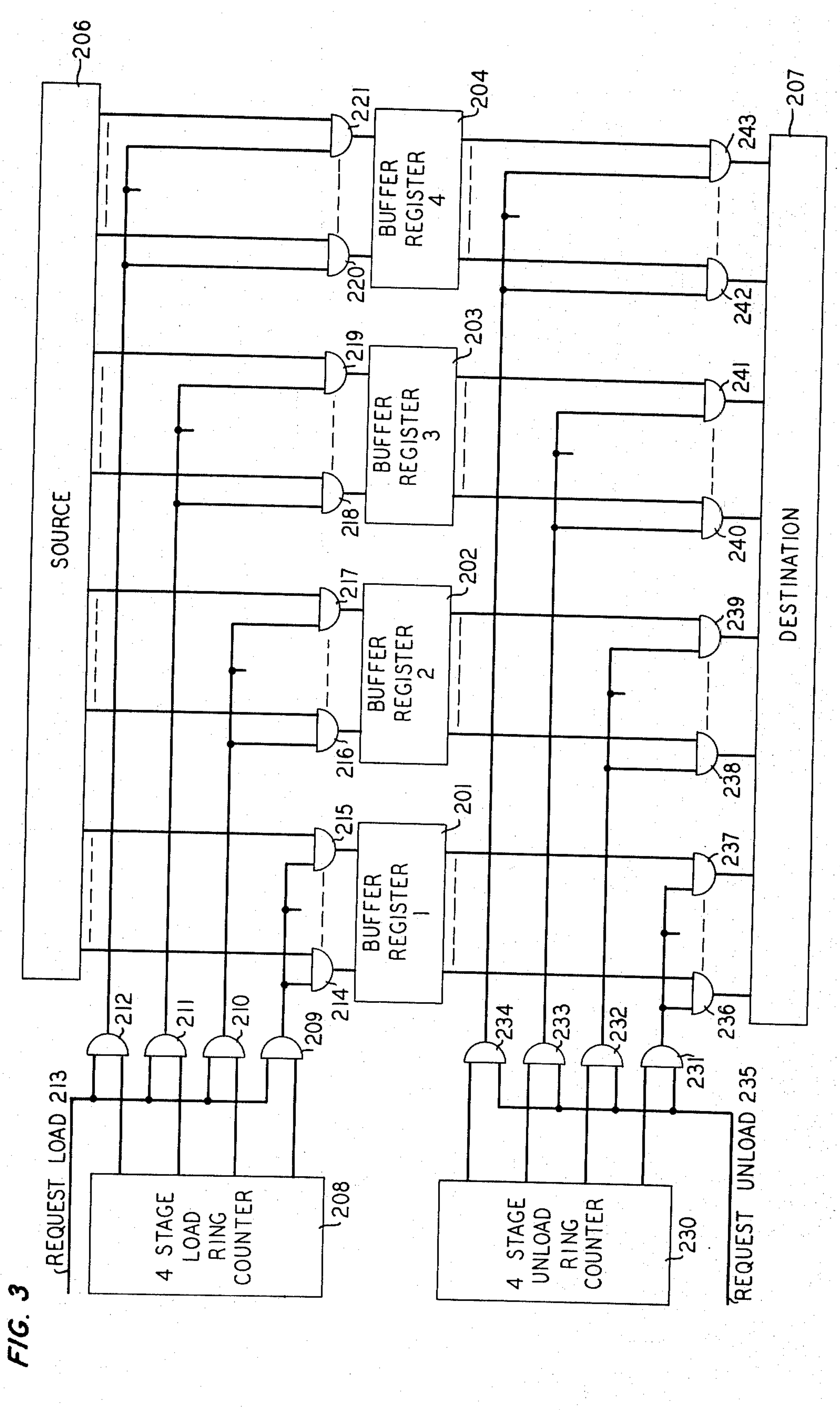
FIG. 3 is an illustrative example of a specific digital processor circuit to which the instant invention may be advantageously applied.

FIG. 3 illustrates a specific digital processor circuit which comprises a four-register temporary store data buffer. In the desired operation of the circuit shown in FIG. 3, buffer registers 201, 202, 203, and 204 serve to receive, upon command, information from source 206 and transfer it to destination 207. Source 206 and destination 207 may comprise other data registers, data channels, or any other data devices well known to the prior art.

The loading of buffer registers 201–204 is controlled by load counter 208. Load counter 208 is a four-output ring counter which, when operating without error, generates an output on only one output line at a time and sequentially steps its output between the four output lines. The outputs of load counter 208 are applied through AND gates 209–212 to AND gates 214–221. AND gates 214–221 gates information from source 206 into the buffer registers 201–204. AND gates 209-212 are additionally enabled by a request load command appearing on line 213. Thus it can be seen that buffers 201–204 will serve as buffers for source 206 in a sequential manner. It is further apparent that, in the absence of error, only one of buffer registers 201–204 can be loaded at a particular time. That is, simultaneous loading cannot occur.

The unloading of buffer registers 201–204 to destination 207 is controlled by unload counter 230. AND gates 236–243 serve to gate the contents of buffer registers 201–204 out to destination 207 in a manner analogous to the way in which AND gates 214–221 gate digital words from source 206 into the buffer registers. AND gates 231–234 serve to gate the output of unload counter 230 to AND gates 236–243 under the control of the request unload signal appearing on line 235.

As can be seen from the above description of the circuit of FIG. 3, the proper operation of both load counter 208 and unload counter 230 is critical to the proper loading and unloading of buffer registers 201–204. A failure in load counter 208 can result in a new word from source 206 being written into an already full buffer register, causing complete loss of the word previously contained in the buffer register. Similarly, a failure of unload counter 230 can cause the improper transfer of a word from one of the buffer registers to the destination 207. Since the buffer registers are not cleared between loading and unloading, this can have the effect of generating a word that was not intended to exist. These error conditions can be detected by applying the instant invention to both load counter 208 and unload counter 230.

Figure 4:
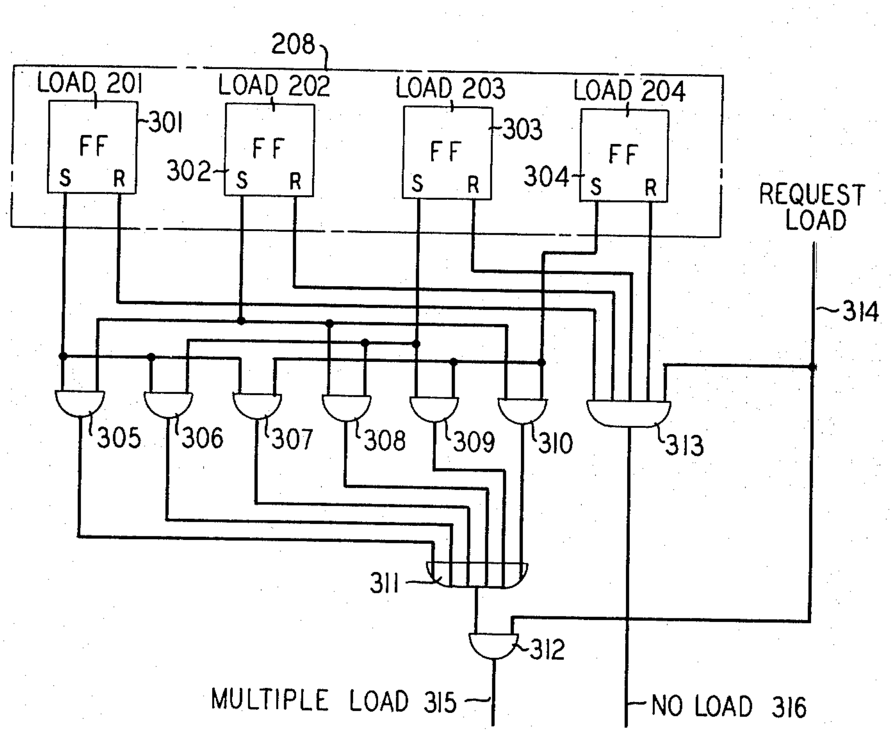
FIG. 4 is a logic diagram illustrating a portion of the circuitry which is applied to the circuit of FIG. 3 in accordance with the instant invention.

FIG. 4 shows the application of the instant invention to the load counter 208 shown in FIG. 3. As shown in FIG. 4, load counter 208 comprises four flip-flops 301–304. In order for these four flip-flops to function as a ring counter, they would have to be interconnected in an appropriate manner well known to the prior art. These interconnections form no part of the instant invention and have been deleted from FIG. 4 for the sake of improving clarity.

Each of flip-flops 301–304 serves to generate an enabling signal to one of the buffer registers, as indicated by their respective labels in FIG. 4. That is, for example, flip-flop 301 generates the enabling signal to allow the loading of buffer register 201.

AND gates 305–310 shown in FIG. 4 serve to AND together all possible two-at-a-time combinations of the set outputs of flip-flops 301–304. Thus the simultaneous occurrence of a set output on any two of flip-flops 301–304 will produce an output signal from one of AND gates 305–310. The outputs of AND gates 305-310 are applied to OR gate 311, the output of which is in turn applied to AND gate 312. The request load signal appearing on line 314 is additionally applied to AND gate 312. AND gate 312 will generate an output signal on line 315 if any two of flip-flops 301–304 are simultaneously set during the existence of the request load signal. The output of AND gate 312 thus indicates a "multiple load" condition. That is, whenever AND gate 312 generates an output it means that two of the four buffer registers 201–204 shown in FIG. 3 are simultaneously receiving the same digital word from source 206 shown in FIG. 3. In accordance with the above description of the proper operation of the circuit of FIG. 3, this is seen to be an error condition.

AND gate 313 shown in FIG. 4 serves to combine the reset outputs of flip-flops 301–304 with the request load signal appearing on line 314. Thus AND gate 313 will generate an output whenever every one of flip-flops 301–304 is in a reset condition during the time of the existence of a request load control signal. This means, in essence, that a request to load one of buffer registers 201–204 has been made but no particular one of the four buffer registers has been indicated by load counter 208. That is, none of AND gates 209–212 shown in FIG. 3 would generate an output. This would have the result that the current word coming from source 206 would not be gated into any one of buffer registers 201–204. This is seen to be an error condition and hence a "no-load" signal will be generated on line 316 by AND gate 313.

As is obvious from an inspection of FIG. 4, the exact same combination of AND and OR gates shown there must also be attached to unload counter 230 shown in FIG. 3. Since they would function in exactly the same manner, it is considered superfluous to further discuss them here.

Figure 5:
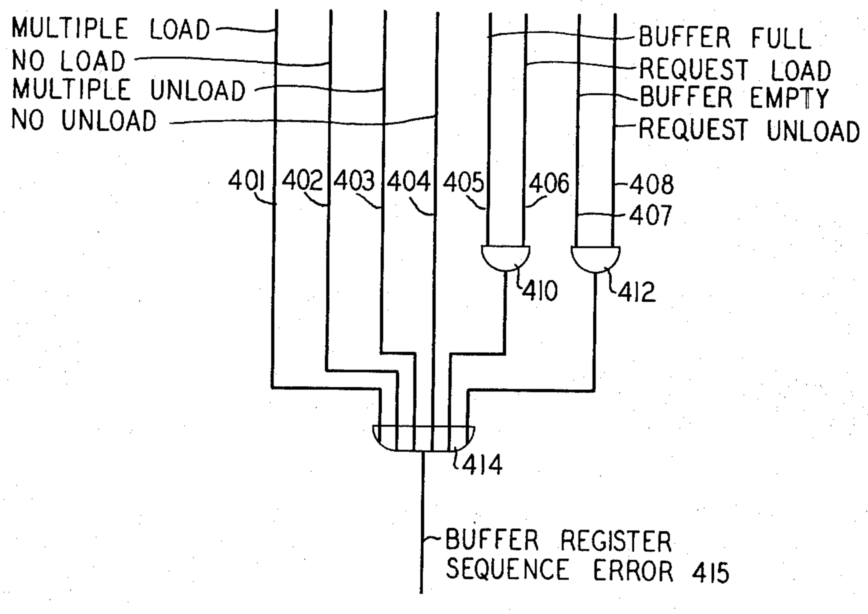
FIG. 5 is a logic diagram illustrating another portion of the circuitry which is associated with the circuitry shown in FIG. 4.

FIG. 5 shows the manner in which the output signals from the error checking circuitry shown in FIG. 4 are combined with the similar error checking circuitry associated with unload counter 230 shown in FIG. 3 to provide for the generation of an error signal. Lines 401 and 402, shown in FIG. 5, correspond exactly to lines 315 and 316 shown in FIG. 4. Similarly, lines 403 and 404 correspond to the analogous outputs to the error checking circuitry associated with unload counter 230 shown in FIG. 3. The request load signal of line 406 is the same as that shown on line 314 in FIG. 4 and line 213 in FIG. 3. The request unload signal of line 408 is the same as that shown on line 235 of FIG. 3. The buffer full signal on line 405 and the buffer empty signal on line 407 are here assumed to be available from a source associated with the data processing circuitry but not specifically shown in FIGS. 3 or 4. The buffer full signal on line 405 and the request load signal on line 406 are combined in AND gate 410. The simultaneous occurrence of these two signals signifies an attempt to load a buffer register that is currently full. Since this is an error condition, the output of AND gate 410 is applied to OR gate 414. As shown in FIG. 5, the output signal of OR gate 414 appearing on line 415 indicates that a buffer register sequence error has occurred. OR gate 414 is thus seen to be analogous to the error signal generator 16 shown in FIG. 1.

AND gate 412 combines the buffer empty signal on line 407 and the request unload signal on line 408. The simultaneous occurrence of these two signals indicates that a currently empty buffer register has been unloaded. As this is also an error condition, the output of gate 412 is applied to gate 414. Since the signals appearing on lines 401–404 already indicate the presence of an error condition, they are directly applied to OR gate 414.

What is claimed is:

1. An error detection circuit for a digital storage device having the capability of being loaded by a plurality of inputs in response to commands generated by a load control means and unloaded to a plurality of outputs in response to commands generated by an unload control means, said circuit comprising;

means connected to said load control means for detecting undesired simultaneous commands to load said data storage device from more than one of said plurality of inputs;

means connected to said unload control means for detecting undesired simultaneous commands to unload said data storage device to more than one of said plurality of outputs;

means connected to both said load control means and said unload control means for detecting an improper sequence of commands to load and unload said data storage device; and means responsive to each of said detecting means for generating an error signal.

2. An error detection circuit for a digital storage device having the capability of being loaded by a plurality of inputs in response to commands generated by a load control means and unloaded to a plurality of outputs in response to commands generated by an unload control means, said circuit comprising:

means connected to said load control means for detecting the condition of said data storage device not being loaded by any of said plurality of inputs when a load command is given by said load control means;

means connected to said load control means for detecting undesired simultaneous commands to load said data storage device from more than one of said plurality of inputs;

means connected to said unload control means for detecting the condition of said data storage device not being unloaded to any of said plurality of outputs when an unload command is given by said unload control means;

means connected to said unload control means for detecting undesired simultaneous commands to unload said data storage device to more than one of said plurality of outputs;

means connected to both said load control means and said unload control means for detecting an improper sequence of commands to load and unload said data storage device; and means responsive to each of said detecting means for generating an error signal.

3. An error detection circuit for a register having the capability of being loaded by a plurality of inputs in response to commands generated by a load control means and being unloaded to a plurality of outputs in response to commands generated by an unload control means, said circuit comprising:

means connected to said load control means for detecting undesired simultaneous commands to load said register from more than one of said plurality of inputs;

means connected to said unload control means for detecting undesired simultaneous commands to unload said register to more than one of said plurality of outputs;

means connected to both said load control means and said unload control means for detecting the conditions of said register being loaded twice in succession without being unloaded or being unloaded twice in succession without being loaded; and means responsive to each of said detecting means for generating an error signal.

4. The error detection circuit of claim 3 wherein said means for detecting undesired simultaneous commands to load said register further comprises:

a plurality of AND gates connected to the control lines of said load control means that are used to load said register, said AND gates being connected so as to AND together all possible two-at-a-time combinations of said control lines; and an OR gate connected to the outputs of said plurality of AND gates.

5. The error detection circuit of claim 3 wherein said means for detecting undesired simultaneous commands to unload said register further comprises:

a plurality of AND gates connected to the control lines of said unload control means that are used to unload said register, said AND gates being connected so as to AND together all possible two-at-a-time combinations of said control lines; and an OR gate connected to the outputs of said plurality of AND gates.

6. The error detection circuit of claim 3 wherein said means for detecting the conditions of said register being loaded twice in succession without being unloaded or being unloaded twice in succession without being loaded further comprises:

a one-bit memory connected both to said means for detecting undesired simultaneous commands to load said register and to said means for detecting undesired simultaneous commands to unload said register.

7. The error detection circuit of claim 3 wherein said means for generating an error signal further comprises:

an OR gate.

8. An error detection circuit for a register having the capability of being loaded by a plurality of inputs in response to commands generated by a load control means and being unloaded to a plurality of outputs in response to commands generated by an unload control means, said circuit comprising:

means connected to said load control means for detecting the condition of said register not being loaded by any of said plurality of inputs when a load command is given by said load control means;

means connected to said load control means for detecting undesired simultaneous commands to load said register from more than one of said plurality of inputs;

means connected to said unload control means for detecting the condition of said register not being unloaded to any of said plurality of outputs when an unload command is given by said unload control means;

means connected to said unload control means for detecting undesired simultaneous commands to unload said register to more than one of said plurality of outputs;

means connected to both said load control means and said unload control means for detecting the conditions of said register being loaded twice in succession without being unloaded or being unloaded twice in succession without being loaded; and means responsive to each of said detecting means for generating an error signal.

9. An error detection circuit for a register having the capability of being loaded by a plurality of inputs in response to commands generated by a load control means and being unloaded to a plurality of outputs in response to commands generated by an unload control means, said circuit comprising:

means connected to said load control means for detecting the condition of said register not being loaded from any of said plurality of inputs when a load command is given by said load control means;

means connected to both said load control means and said unload control means for detecting the conditions of said register being loaded twice in succession without being unloaded or being unloaded twice in succession without being loaded; and means responsive to each of said detecting means for generating an error signal.

10. An error detection circuit for a register having the capability of being loaded by a plurality of inputs in response to commands generated by a load control means and being unloaded to a plurality of outputs in response to commands generated by an unload control means, said circuit comprising:

means connected to said unload control means for detecting the condition of said register not being unloaded to any of said plurality of outputs when an unload command is given by said unload control means;

means connected to both said load control means and said unload control means for detecting the conditions of said register being loaded twice in succession without being unloaded or being unloaded twice in succession without being loaded; and means responsive to each of said detecting means for generating an error signal.

11. An error detection circuit for a register having the capability of being loaded by a plurality of inputs in response to commands generated by a load control means, said circuit comprising:

means connected to said load control means for detecting the condition of said register not being loaded by any of said plurality of inputs when a load command is given by said load control means;

means connected to said load control means for detecting undesired simultaneous commands to load said register from more than one of said plurality of inputs; and means responsive to each of said detecting means for generating an error signal.

12. An error detection circuit for a register having the capability of being unloaded to a plurality of outputs in response to commands generated by an unload control means, said circuit comprising:

means connected to said unload control means for detecting the condition of said register not being unloaded to any of said plurality of outputs when an unload command is given by said unload control means;

means connected to said unload control means for detecting undesired simultaneous commands to unload said register to more than one of said plurality of outputs; and means responsive to each of said detecting means for generating an error signal.

13. An error detection circuit for a register having the capability of being loaded by a plurality of inputs in response to commands generated by a load control means and being unloaded to a plurality of outputs in response to commands generated by an unload control means, said circuit comprising:

means connected to said load control means for detecting the condition of said register not being loaded by any of said plurality of inputs when a load command is given by said load control means;

means connected to said unload control means for detecting the condition of said register not being unloaded to any of said plurality of outputs when an unload command is given by said unload control means; and means responsive to each of said detecting means for generating an error signal.

* * * * *